United States Patent Office 3,111,403
Patented Nov. 19, 1963

3,111,403
HERBICIDAL METHOD
Quentin F. Soper, Indianapolis, Ind., assignor to Eli Lilly and Company, Indianapolis, Ind., a corporation of Indiana
No Drawing. Filed Aug. 31, 1960, Ser. No. 53,069
5 Claims. (Cl. 71—2.3)

This invention relates to novel herbicidal compositions and to processes employing these compositions. More particularly, this invention relates to novel herbicidal processes employing compositions in which a dinitroaniline is the herbicidally active ingredient.

This invention provides a novel process for the elimination of grasses and broad-leaf plants which comprises applying to areas infested with grasses and broad-leaf plants either as seeds or as seedlings or mature plants a herbicidal amount of a compound having the following formula:

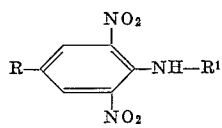

wherein R is hydrogen, chlorine, trifluoromethyl or lower alkyl having from 1–4 carbon atoms, and $R^1$ is hydrogen, methyl, ethyl, n-propyl or n-butyl: Illustrative compounds coming within the scope of the above formula include 2,6-dinitroaniline, 4-methyl 2,6-dinitroaniline, N-ethyl 4-ethyl-2,6-dinitroaniline, N-methyl 4-isopropyl-2,6-dinitroaniline, 4-chloro-2,6-dinitroaniline, N-n-propyl 4-trifluoromethyl-2,6-dinitroaniline, 4-n-butyl-2,6-dinitroaniline, and the like.

Compounds represented by the above formula preferably are formulated for use as pre-emergent or post-emergent herbicides either as emulsifiable concentrates or wettable powders for sprays, as granules, or as dispersions on carriers such as peat moss or vermiculite. The compounds are quite insoluble in water, and hence for the preparation of emulsions or wettable powders, the compounds are preferably formulated with wetting agents.

The novel processes of this invention comprise treating an area infested with grasses and/or broad-leaf plants in the seed-, seedling-, and/or mature-plant stage with a granular formulation, a dispersion on an inert carrier, or a spray containing a dinitroaniline as represented by the above formula as the herbicidally active ingredient. Typical of areas from which grasses and broad-leaf plants can be eliminated are gravel walks, shoulders of roads, fence rows, rainage ditches, brush-infested woodland areas, and the like. In addition, herbicidal formulations containing a dinitroaniline can be applied between rows of crops in crop-bearing areas, as for example corn, cotton, soybean, or tomato fields, strawberry patches, and the like, provided care is taken that the herbicidal preparation does not reach the crop-bearing plants.

It is a considerable advantage of this invention that the dinitroanilines as defined above can be employed as pre-emergent herbicidal compositions at the time of planting of such crop plants as corn, cotton, soybeans, lima beans, snap beans, wheat, okra, sugar beets, sorghum, cucumbers, etc. When thus applied, the herbicidal compositions of this invention will eliminate germinating weed grasses and broad-leaf weeds without affecting the growth of the germinating crop plant.

In eliminating grasses and broad-leaf plants from areas infested therewith, the herbicidally active dinitroaniline is distributed to the area in a suitable formulation by methods well known to the art at the rate of from .2 to 16 lb. per acre. For most purposes I prefer to apply the herbicidal compositions of this invention at the rate of from 4 to 16 lb. of active ingredient per acre. However, if a granular formulation is employed, I prefer to use about twice the amount of active ingredient per acre as when a spray formulation is used, since the active ingredient becomes available more slowly from a granular formulation.

Seedling and mature grasses which are eliminated by the application of a herbicidal composition as provided by this invention include the crabgrasses (*Digitaria sanguinalis* and *Digitaria ischaemum*); Japanese millet (*Echinochloa crusgalli* var. *frumentacea*); German millet (*Setaria italica*); yellow foxtail (*Setaria lutescens*); Bermuda grass (*Cynodon dactylon*); Kentucky bluegrass (*Poa pratensis*); fescues (Festuca sp); bentgrass (*Agrostis lenuis*); goosegrass (*Eleusine indica*); Johnson grass (*Sorghum halepense*); and perennial rye-grass (*Lolium perenne*). In addition, compounds represented by the above formula have the advantage of not affecting the crop grasses, corn and wheat, in the seedling stage at rates of application which will eliminate the above weed grasses as well as most broad-leaf weeds.

As previously stated, most broad-leaf plants in both the seedling and mature stages of growth can be eliminated by applying to their leaves a herbicidal composition containing a dinitroaniline coming within the scope of the above formula. Among these broad-leaf plants are leguminous plants such as alfalfa, Solanaceous plants such as Jimson weed, members of the composite family such as ragweed, plants of the Amaranthaceae such as pigweed, polygonaceous plants such as smartweed, and cruciferous plants such as the mustards.

This invention is further illustrated by the following specific examples:

EXAMPLE 1

The ability of the compositions of this invention to kill germinating and seedling plants was demonstrated by the following experimental procedure: A soil was prepared consisting of one part masonry sand and one part shredded top soil blended together in a cement mixer. One gallon of this soil was placed in a 25 x 35 cm. galvanized flat and was patted down with a bench brush until level. A three-row marker was used to make a 2½ cm. deep furrows in approximately two-fifths of the flat. Crop seeds consisting of four kernels of corn, five cotton seeds and five soybean seeds were placed in these furrows. A four-row template was then placed on the remaining soil, and the indicated amounts of each of the following seeds were planted, one species to each section: German millet, 100 mg; broad-leaf mustard (*Brassica juncea*), 50–75 mg.; rough pigweed, 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compositions as preemergent herbicides, a flat prepared as above, taken either on the day of planting or on the next day, was placed in a chamber equipped with a turntable and an air exhaust. The herbicidal composition, whether it was a spray-type emulsion or a wettable powder, was applied to the flat with a modified DeVilbiss atomizer hooked to an air source. Twelve and one-half ml. of the composition under test were applied to each flat either on the day of planting or the succeeding day. Injury ratings and observations as to type of injury were made in either case eleven to twelve days after treatment. The injury rating scale used was as follows:

0—no injury
1—slight injury
2—Moderate injury
3—severe injury
4—death

When more than one determination was carried out, an average value was calculated for the injury rating.

The following table sets forth the results of preemergent testing of several dinitroaniline compounds. In the table, column 1 gives the name of the compound; column 2, the rate in terms of pounds per acre at which the compound was applied to the test flat; and columns 3 through 9, the injury rating for the particular plant seeds or seedlings.

*Table I.—Injury Rating on Pre-Emergent Treatment*

| Compound | Lbs./Acre | Corn | Cotton | Soybean | Crab-grass | Mustard | Pigweed | Foxtail Millet |
|---|---|---|---|---|---|---|---|---|
| 2,6-dinitroaniline | 8 | 0 | 1 | 1.5 | 3.5 | 3.5 | 4 | 4 |
| | 4 | 0 | 0.3 | 0 | 4 | 3.7 | 4 | 4 |
| | 2 | 0 | 0 | 0.2 | 3.6 | 1.8 | 4 | 3.5 |
| | 1 | 0.2 | 0 | 0 | 3.2 | 1.8 | 1.6 | |
| | 0.5 | 1 | 0 | 1 | 4 | 0 | 0 | |
| | 0.2 | 0 | 0 | 0 | 0 | 0 | 0 | |
| | 0.1 | 0 | 0 | 0 | 1 | 0 | 0 | |
| 2,6-dinitro-p-toluidine | 8 | 0 | 0 | 2 | 4 | 4 | 4 | |
| | 4 | 0 | 0 | 0.4 | 3.8 | 4 | 4 | 4 |
| | 2 | 0 | 0 | 0 | 3.3 | 2 | 3.3 | 3.2 |
| | 1 | 0 | 0 | 0 | 2.8 | 0 | 1.5 | 1 |
| | 0.5 | 0 | 0 | 0 | 0.5 | 0 | 0.5 | 0 |
| N-n-butyl 2,6-dinitroaniline | 8 | 0 | 0 | 0 | 4 | 3 | 3 | |
| | 4 | 0 | 0 | 0 | 3 | 1 | 3 | 4 |
| | 2 | 0 | 0 | 0 | 2.5 | 0.5 | 1 | 2 |
| | 1 | 0 | 0 | 0 | 1 | 0 | 0.5 | 0 |
| 4-chloro-2,6-dinitroaniline | 8 | 0 | 2 | 1 | 3 | 4 | 4 | 2 |
| | 4 | 0 | 0 | 0 | 1 | 2 | 2 | 1 |
| | 2 | 0 | 0 | 0 | 0 | 0 | 0 | 0 |
| | 1 | 0 | 0 | 0 | 0 | 0 | 0 | 0 |
| | 0.5 | 0 | 0 | 0 | 0 | 0 | 0 | 0 |
| 4-t-butyl-2,6-dinitroaniline | 8 | 0 | 0 | 1 | 4 | 2 | 4 | 3 |
| N-ethyl 4-chloro-2,6-dinitroaniline | 8 | 0 | 0 | 0 | 3 | 2 | 2 | 3 |
| | 4 | 0 | 0 | 0 | 3 | 1 | 3 | 3 |
| | 2 | 0 | 0 | 0 | 2 | 0 | 0 | 3 |
| | 1 | 0 | 0 | 0 | 1 | 0 | 0 | 1 |
| N-ethyl 2,6-dinitroaniline | 8 | 0.5 | 1 | 1 | 4 | 4 | 4 | 4 |
| | 4 | 0 | 0 | 1 | 4 | 4 | 4 | 4 |
| | 2 | 0 | 0 | 0 | 3.5 | 1.5 | 2 | 3 |
| | 1 | 0 | 0 | 0 | 1 | 0 | 1 | 1 |
| N-n-propyl 2,6-dinitroaniline | 8 | 0 | 1 | 0 | 3 | 4 | 3 | |
| | 4 | 0 | 0 | 0 | 3 | 3.5 | 4 | 4 |
| | 2 | 0 | 0 | 0 | 3 | 2 | 2 | 3.5 |
| | 1 | 0 | 0 | 0 | 0 | 0 | 1 | 0.5 |
| N-methyl 2,6-dinitroaniline | 8 | 0 | 1 | 1 | 3 | 3 | 4 | |
| | 4 | 0 | 0 | 0 | 3 | 4 | 4 | 4 |
| | 2 | 0.5 | 0 | 0 | 3.5 | 2 | 3.5 | 3 |
| | 1 | 0 | 0 | 0 | 2 | 0.5 | 2 | 1 |
| | 0.5 | 0 | 0 | 0 | 2 | 1 | 1 | |

EXAMPLE 2

For measuring the efficacy of the dinitroanaline com-

*Table II.—Injury Rating on Post-Emergent Treatment*

| Compound | Lbs./Acre | Corn | Cotton | Soybean | Crab-grass | Mustard | Pigweed | Foxtail Millet |
|---|---|---|---|---|---|---|---|---|
| 2,6-dinitroaniline | 8 | 3 | 3.5 | 4 | 4 | 3 | 4 | |
| | 4 | 3 | 4 | 3.6 | 4 | 4 | 4 | 4 |
| | 2 | 2.5 | 3.8 | 3.4 | 3.5 | 3.9 | 4 | 4 |
| | 1 | 2.1 | 3.4 | 2.9 | 3.7 | 3.6 | 3.7 | 4 |
| | 0.5 | 1.3 | 2 | 1.3 | 1.6 | 3 | 3 | |
| | 0.2 | 2 | 2 | 2 | 3 | 3 | 4 | |
| | 0.1 | 1 | 2 | 2 | 2 | 2 | 4 | |
| 2,6-dinitro-p-toluidine | 8 | 3 | 4 | 4 | 4 | 4 | 4 | |
| | 4 | 2.5 | 4 | 3.5 | 4 | 4 | 4 | 4 |
| | 2 | 2 | 3 | 2.9 | 3.9 | 4 | 3.7 | 4 |
| | 1 | 1.8 | 2.4 | 2 | 3.6 | 3.6 | 3.4 | 3.5 |
| | 0.5 | 1.8 | 1.3 | 1.3 | 2.8 | 3 | 2 | |
| N-n-butyl 2,6-dinitroaniline | 8 | 2 | 3 | 3 | 4 | 4 | 4 | |
| | 2 | 1.3 | 0.7 | 0.7 | 2 | 2 | 1 | |
| | 1 | 1 | 0 | 0 | 1.3 | 1 | 0.3 | |
| | 0.5 | 0 | 0 | 0 | 0 | 0.5 | 0 | 0 |
| 4-chloro-2,6-dinitroaniline | 8 | 2 | 3 | 2 | 3 | 4 | 4 | 2 |
| | 4 | 2 | 3 | 2 | 3 | 4 | 2 | 2 |
| | 2 | 1 | 2 | 2 | 2 | 4 | 1 | 1 |
| | 1 | 1 | 1 | 1 | 2 | 3 | 1 | 1 |
| | 0.5 | 1 | 1 | 1 | 1 | 2 | 1 | 1 |
| 4-t-butyl-2,6-dinitroaniline | 8 | 1 | 1 | 1 | 3 | 3 | 2 | 0 |
| N-ethyl 4-chloro-2,6-dinitroaniline | 8 | 1 | 0 | 1 | 3 | 4 | 2 | 2 |
| N-ethyl 2,6-dinitroaniline | 8 | 1 | 4 | 2.5 | 4 | 4 | 4 | 4 |
| | 4 | 2 | 3 | 3 | 4 | 4 | 4 | 4 |
| | 2 | 1.8 | 2.5 | 1.8 | 3 | 3.3 | 3.8 | 3 |
| | 1 | 1.3 | 1 | 1 | 2 | 1.7 | 2 | 3 |
| | 0.5 | 0.5 | 0 | 0 | 1 | 0.5 | 1 | |
| N-n-propyl 2,6-dinitroaniline | 8 | 1 | 4 | 2 | 4 | 4 | 4 | |
| | 4 | 1 | 3.5 | 3 | 3.5 | 4 | 4 | 4 |
| | 2 | 1 | 2.3 | 2.3 | 3 | 3.3 | 3.3 | 3 |
| | 1 | 0 | 1.3 | 1.5 | 2.3 | 2.8 | 2.5 | 1.3 |
| | 0.5 | 0 | 0 | 0 | 0 | 0.5 | 0 | 0 | positions as post-emergent herbicides, the same experimental procedure was employed as in Example 1, except that the flats were sprayed after nine to twelve days growth in the greenhouse. The results appear in Table II, reported on the same basis as in Table I.

EXAMPLE 3

Further testing of certain of the compounds was carried out against a broader spectrum of plants including various crop and ornamental plants, broad-leaf plants including legumes, as well as other weeds and desirable grasses. In a pre-emergent test the seeds were sown in flats as in the previous examples and were treated with the formulated compound the following day. Observations as to injury rating were made in most cases fourteen days after treatment. However, since three weeks' time is required for certain slow-growing species, observations were made up to twenty-one days after treatment.

In a post-emergent extended test, the various species of plants were seeded in three-inch square wood bands with bottoms. Soil was placed in the band and pressed down to an even depth. Small seeds were planted by covering them with up to 6 mm. of soil, whereas large seeds, such as beans, corn, cotton, sorghum and the like, were planted 12 mm. or more below the surface of the soil. The planted boxes were placed in a greenhouse, and by judiciously regulating the planting time, plants of different types were readied for treatment at the same time despite the wide difference (seven to twenty-one days) in the time required for seeds of the various plants to germinate and for the seedlings to grow to a suitable size. Flats containing one box of each of the species under test were assembled and sprayed with the test material by the procedure described above in Example 1.

Table III sets forth the results of the described tests, employing the herbicidally active compounds 2,6-dinitro-p-toluidine and 2,6-dinitroaniline. Both of these compounds had shown outstanding activity in the post-emergent tests set forth in Example 2. In Table III, column 1 gives the name of the plant used; column 2 its variety; column 3, the results of pre-emergent treatment at 1, 2, 4, 8 and 16 lb. per acre for 2,6-dinitro-p-toluidine; column 4, the results at the same rates of application for the same compound in post-emergent testing; and columns 5 and 6, similar data for 2,6-dinitroaniline. The injury ratings used are the same as those employed in Tables I and II.

*Table III*

| Plant | Variety | 2,6-dinitro-p-toluidine | | | | | | | | | | 2,6-dinitroaniline | | | | | | | |
|---|---|---|---|---|---|---|---|---|---|---|---|---|---|---|---|---|---|---|---|
| | | Pre-Emergent | | | | | Post-Emergent | | | | | Pre-Emergent | | | | Post-Emergent | | | |
| | | 1 | 2 | 4 | 8 | 16 | 1 | 2 | 4 | 8 | 16 | 1 | 2 | 4 | 8 | 1 | 2 | 4 | 8 |
| Alfalfa | Ranger | 0.5 | 2.5 | 3.5 | 4 | 4 | 1.3 | 3 | 4 | 4 | 4 | 0 | 2 | 3.5 | 4 | 2 | 4 | 4 | 4 |
| Beans | Contender | 0 | 0 | 0 | 0 | 1 | 1.5 | 3.5 | 3 | 3.5 | 4 | | | | | | | | |
| Bentgrass | Seaside | 1.5 | 2 | 4 | 4 | 4 | 0.5 | 1 | 2 | 3.5 | 4 | | | | | | | | |
| Bermuda Grass | U-3 | 1 | 4 | 4 | 4 | 4 | 1 | 2.5 | 4 | 4 | 4 | 0 | 1 | 3 | 4 | 3 | 3.5 | 3.5 | 4 |
| Bindweed | | 0 | 0 | 0 | | | 4 | 4 | 4 | | | | | | | 1 | 4 | 4 | |
| Bluegrass | Kentucky | 0 | 1.5 | 3 | 4 | 4 | 1 | 2 | 3.5 | 4 | 4 | | | | | | 2 | 3 | |
| Cantaloupe | Hearts of Gold | 0 | 0.5 | 1 | 1 | 3.5 | 2.5 | 4 | 4 | 4 | 4 | | | | | | | | |
| Clover | Crimson | 3 | 4 | 4 | 4 | 4 | 1 | 2 | 3.5 | 4 | 4 | | | | | | | | |
| Do | Dutch White | 2.5 | 4 | 4 | 3.5 | 4 | 1 | 1.5 | 3 | 4 | 4 | | | | | | | | |
| Do | Medium Red | 2 | 1.5 | 3 | 2.5 | 3.5 | 2.5 | 4 | 4 | 4 | 4 | | | | | | | | |
| Cucumber | Wisc. SR-6 | 0 | 0 | 0 | 0 | 0 | 4 | 4 | 4 | 4 | 4 | | | | | | | | |
| Fescue | Chewings | 0 | 1 | 2 | 2.5 | 3 | 0 | 0.5 | 1 | 3 | 4 | | | | | | | | |
| Flax | | 1 | 1 | 1 | 3.5 | 3 | 1 | 3 | 4 | 4 | 4 | | | | | | | | |
| Foxtail | Yellow | 0 | 1 | 3.5 | 4 | 4 | 0.5 | 1 | 2.5 | 4 | 4 | 0 | 2.3 | 3 | 3 | 4 | 4 | 4 | 4 |
| Lespedeza | Korean | 1 | 2.5 | 2 | 3.5 | 4 | 1 | 2 | 3.5 | 3.5 | 4 | | | | | | | | |
| Lima Beans | Henderson Bush | 0 | 0 | 0 | 0.5 | 1 | 1 | 1.5 | 3.5 | 3.5 | 4 | | | | | | | | |
| Millet | Japanese | 0 | 1 | 2 | 3.5 | 4 | 3 | 3 | 4 | 4 | 4 | | | | | | | | |
| Nutgrass | Yellow | 0 | 0 | 0 | 0 | 0 | 0 | 0 | 0 | 1 | 1 | | | | | | | | |
| Okra | Clemson Spineless | 0 | 0.5 | 0 | 0 | 0.5 | 4 | 4 | 4 | 4 | 4 | | | | | | | | |
| Radishes | Early Scarlet | 1 | 0 | 2 | 3 | 3.5 | 2.5 | 3.5 | 4 | 4 | 4 | | | | | | | | |
| Ragweed | Common | 0 | 0 | 1 | 2.5 | 2 | 1.5 | 3 | 3.5 | 4 | 4 | | | | | | | | |
| Rye | Perennial | 0 | 0.5 | 1 | 2 | 2 | 1 | 1 | 2 | 2 | 3 | | | | | | | | |
| Smartweed | Pennsylvania | 0 | 1 | 2 | 4 | 4 | 2 | 3 | 4 | 4 | 4 | | | | | | | | |
| Sorghum | Amak R-10 | 0 | 0 | 0 | 0 | 0.5 | 1 | 1 | 2 | 2 | 2 | | | | | | | | |
| Squash | Blue Hubbard | 0.5 | 0.5 | 0 | 1 | 0.5 | 2 | 3 | 4 | 4 | 4 | | | | | | | | |
| Sugar Beets | No. 359 | 0 | 0 | 0.7 | 1 | 1 | 0.7 | 3 | 3.7 | 4 | 4 | 0 | 2 | 4 | 4 | 2 | 3.6 | 4 | 4 |
| Tomato | Rutgers | 0 | 1 | 1 | 4 | 3 | 4 | 4 | 4 | 4 | 4 | | | | | | | | |
| Velvet Leaf | | 0 | 0 | 1 | 2 | 3.5 | 1 | 2 | 3 | 3.5 | 4 | | | | | | | | |
| Wheat | Vermillion | 0 | 0 | 0 | 0 | 0.5 | 0.5 | 0.5 | 1 | 2 | 2 | 0 | 0 | 0 | 2 | 1 | 1.6 | 2 | 3 |
| Wild Mustard | | 0 | 1 | 1.5 | 4 | 4 | 2 | 3 | 4 | 4 | 4 | | | | | | | | |
| Wild Oats | | 0 | 0 | 0 | 0 | 0.5 | 0 | 0.5 | 0.5 | 2 | 3 | 0 | 0 | 2 | 3 | 1 | 3 | 3 | 4 |

In the above examples of the invention, the compound under test was formulated as a spray by one of the following procedures: In one method the compound was wetted by grinding in a mortar with one part of a dispersing agent such as polyoxyethylene sorbitan mono-oleate. Five hundred parts of water were added slowly to the resultant creamy paste to give an aqueous dispersion with a surfactant concentration of 0.2 percent. This dispersion was entirely satisfactory for spray application. In a second procedure the compound was dissolved in one volume of acetone, and the acetone solution was diluted with 19 volumes of water containing 0.1 percent of polyoxyethylene sorbitan mono-laurate.

In addition to the spray formulations whose preparation has been described above, the herbicidally active compounds of the present invention can be formulated as wettable powders and also in granular form suitable for spreading. An additional emulsifiable concentrate suitable for dilution with water to form a herbicidal spray containing 0.7 lb. of 2,6-dinitro-p-toluidine per gallon is prepared as follows: 350 g. of 4-methyl 2,6-dinitroaniline are dissolved in a three-component solvent containing 1840 g. of ethanolamine, 571 g. of acetone, and 1027 g. of dimethyl formamide. Finally, 95 g. of nonyl phenoxy polyoxyethylene ethanol surfactant are added.

The dinitroanilines employed in the present invention are prepared by methods well known to the art. In an illustrative method, 2,6-dinitrochlorobenzene is commingled with an appropriate alkylamine, and heated to expedite with an appropriate alkylamine, and the mixture is heated to expedite the desired reaction. The alkylamine is preferably employed in at least about a one-molar excess, so as to react with HCl which is formed as a by-product in the reaction and to permit its ready removal from the reaction medium. Other bases such as potassium carbonate can, of course, be employed in place of the excess amine as long as the base is even slightly soluble in the reaction medium. The dinitroaniline is separated from the amine hydrochloride byproduct by means of differential solubility; for example, most of the dinitroanilines can be recrystallized from alcohol, a solvent in which a majority of the amine hydrochlorides are quite soluble.

The following will illustrate the preparation of a number of dinitroanilines useful in the processes and compositions of this invention:

PREPARATION 1.—N-METHYL 2,6-DINITROANILINE 1.5 g. of 2,6-dinitrochlorobenzene were dissolved in 25 ml. of ethanol. An excess of an ethanol solution saturated with methylamine was added, and the reaction mixture was heated at refluxing temperature for about 5 hours. The volatile constituents of the reaction mixture were removed by evaporation in vacuo, leaving a yellow-orange residue of N-methyl 2,6-dinitroaniline formed in the above reaction. Recrystallization of the residue from ethanol yields N-methyl 2,6-dinitroaniline melting at about 103–104° C.

Analysis.—Calc.: N, 21.32. Found: N, 21.46.

Table IV which follows lists other N-alkyl 2,6-dinitroanilines prepared according to Preparation 1.

Table IV.—N-Alkyl 2,6-Dinitroanilines

| Name | Recrystallization Solvent | Melting Point, °C | Nitrogen Analysis | |
|---|---|---|---|---|
| | | | Calc | Found |
| N-n-Butyl 2,6-dinitroaniline | ethanol | 30 | 17.57 | 17.36 |
| N-n-Propyl 2,6-dinitroaniline | do | 81–82 | 18.66 | 18.75 |
| N-Ethyl 2,6-dinitroaniline | do | 85–86 | 19.90 | 19.79 |
| N-Methyl 4-chloro-2,6-dinitroaniline | ethanol and water | 92–95 | 18.15 | 17.43 |
| N-Ethyl 4-chloro-2,6-dinitroaniline | ethanol | 92–94 | 17.11 | 16.95 |
| N-n-Propyl 4-chloro-2,6-dinitroaniline | do | 46–48 | 16.19 | 16.41 |

PREPARATION 2.—4-TRIFLUOROMETHYL-2,6-DINITROANILINE 50 g. of 4-chloro-3,5-dinitrobenzoic acid were reacted in an autocalve with 50 g. of sulfur tetrafluoride to form 4-trifluoromethyl-2,6-dinitrochlorobenzene. Evaporation of the reaction mixture to dryness left a solid residue comprising 4-trifluoromethyl-2,6-dinitrochlorobenzene which was purified by recrystallization from a solvent mixture containing hexane and benzene. Crystalline 4-trifluoromethyl-2,6-dinitrochlorobenzene thus prepared melted at about 53–57° C.

Analysis.—Calc.: N, 10.35. Found: N, 9.90.

3 g. of 4-trifluoromethyl-2,6-dinitrochlorobenzene were mixed with an excess of 14 N ammonium hydroxide and stirred at ambient room temperature for 5 hours. The reaction mixture was evaporated to dryness in vacuo, leaving as a residue 4-trifluoromethyl-2,6-dinitroaniline. Recrystallization of the residue from acetone yielded purified 4-trifluoromethyl-2,6-dinitroaniline melting at about 141–142° C.

PREPARATION 3.—2,6-DINITRO-p-TOLUIDINE 32 g. of p-toluidine were dissolved in 100 ml. of ether. The reaction mixture was chilled to about 0° C. and 33.9 g. of chloracetyl chloride were added. The reaction mixture was allowed to remain at ambient room temperature for one hour, and the volatile contents were then removed by evaporation in vacuo. The residue comprising N-chloracetyl p-toluidine was recrystallized from a mixture of ethanol and water and melted at about 159–161° C.

20 g. of N-chloracetyl p-toluidine were added in small portions during a 30-minute period to 200 ml. of fuming nitric acid while maintaining the reaction mixture below 15° C. After the addition had been completed, the reaction mixture was poured into a large excess of a water-ice mixture. N-chloracetyl 2,6-dinitro-p-toluidine formed in the above reaction was insoluble and was separated by filtration. The filter cake was thoroughly washed with water and was dried. Recrystallization of the filter cake from an acetone-water mixture yielded N-chloracetyl 2,6-dinitro-p-toluidine melting at about 172.5–174° C.

Analysis.—Calc.: N, 15.36. Found: N, 15.15.

13 g. of N-chloracetyl 2,6-dinitro-p-toluidine thus prepared was treated with a mixture of 50 ml. of 18 M sulfuric acid and 50 ml. of water for about two hours at a temperature of about 100° C. The reaction mixture was cooled and 2,6-dinitro-p-toluidine formed in the above reaction precipitated and was separated by filtration. Recrysallization of the precipitate from an acetone-water mixture yielded purified 2,6-dinitro-p-toluidine melting at about 166–168° C.

Analysis.—Calc.: N, 21.32. Found: N, 21.34.

PREPARATION 4.—4-t-BUTYL-DINITROANILINE

About 4 g. of 2,6-dinitro-4-t-butylphenol were heated in an autocalve at about 175° C. for about 15 hours in 10 ml. of 27 percent ammonium hydroxide. The nearly black reaction mixture was removed from the autoclave and the volatile substituents evaporated in vacuo. The resulting black residue was extracted with 500 ml. of ether. The ether extract was evaporated to dryness in vacuo, and the residue comprising 4-t-butyl-2,6-dinitroaniline was recrystallized from ethanol, yielding a yellow-brown crystalline material melting at about 115–119° C.

I claim:

1. A method of eliminating all grasses and broadleaf plants from an area infested therewith which comprises applying to said area a herbicidal amount of a compound selected from the group consisting of 2,6-dinitroaniline, N-ethyl 2,6-dinitroaniline,, N-n-propyl 2,6-dinitroaniline, and 2,6-dinitro-p-toluidine.

2. A method for destroying all grasses and broadleaf plants in a soil area which comprises applying to said soil area a herbicidal amount of a composition comprising an inert diluent and as a herbicidally active ingredient, a member of the class consisting of 2,6-dinitroaniline, N-ethyl 2,6-dinitroaniline, N-n-propyl 2,6-dinitroaniline, and 2,6-dinitro-p-toluidine.

3. A method of inhibiting the growth of all grasses and broadleaf plants in an area infested therewith which comprises applying to said area from about 0.2 to about 16 pounds per acre of a herbicidally active compound selected from the group consisting of 2,6-dinitroaniline, N-ethyl 2,6-dinitroaniline, N-n-propyl 2,6-dinitroanline, and 2,6-dinitro-p-toluidine.

4. The process of claim 3 wherein 4-methyl 2,6-dinitroaniline is the herbicidally active compound.

5. The process of claim 3 wherein 2,6-dinitroaniline is the herbicidally active compound.

References Cited in the file of this patent

UNITED STATES PATENTS 2,212,825  Daudt _____ Aug. 27, 1940

OTHER REFERENCES

Waldkotter: Chemical Abstracts, vol. 33, 1931, p. 3341(7).

Thompson: Botanical Gazette, vol. 107, 1946, pp. 475–507.

Elderfield et al.: Chemical Abstracts, vol. 41, 1947, col. 1684(g).

Plant Regulators, CBCC Positive Data Series No. 2, June 1955, pp. 2, b, c, 17, National Research Council.

Foye et al.: Chemical Abstracts, vol. 52, 1958, col. 1099F.

Bell: Chemical Abstracts, vol. 52, 1958, c91, 11764(a).